United States Patent
Lin et al.

(10) Patent No.: US 6,320,339 B1
(45) Date of Patent: Nov. 20, 2001

(54) CONTROL DEVICE FOR CONTROLLING CURRENT PASSING THROUGH A MOTOR

(75) Inventors: Rick Lin, Chang-Hua Hsien; Sheng-Lin Chiu, Nan-Tou Hsien, both of (TW)

(73) Assignee: Universal Scientific Industrial Co., Ltd., Nan-Tou Hsien (TW)

( * ) Notice: Subject to any disclaimer, the term of this patent is extended or adjusted under 35 U.S.C. 154(b) by 0 days.

(21) Appl. No.: 09/659,802

(22) Filed: Sep. 12, 2000

(51) Int. Cl.$^7$ ........................................................ H02P 7/00
(52) U.S. Cl. ........................... 318/432; 318/139; 318/798; 318/434; 318/714; 388/909
(58) Field of Search .................................. 318/432, 434, 318/138, 139, 714, 717, 782, 798, 825, 826; 388/909

(56) References Cited

U.S. PATENT DOCUMENTS

| | | | |
|---|---|---|---|
| 3,719,873 | * 3/1973 | Graf | 318/227 |
| 4,286,303 | * 8/1981 | Genheimer et al. | 361/24 |
| 4,558,264 | * 12/1985 | Weischedel | 318/254 |
| 4,682,094 | * 7/1987 | Kuroiwa | 318/723 |
| 5,341,077 | * 8/1994 | Chen et al. | 318/434 |
| 5,825,597 | * 10/1998 | Young | 361/31 |
| 5,847,523 | * 12/1998 | Rappenecker et al. | 318/434 |
| 5,878,831 | * 3/1999 | Saito et al. | 180/206 |
| 6,170,241 | * 1/2001 | Shibilski et al. | 56/11.9 |
| 6,268,708 | * 7/2001 | Kawada et al. | 318/430 |

* cited by examiner

Primary Examiner—Jeffrey Donels
Assistant Examiner—Rina I. Duda
(74) Attorney, Agent, or Firm—Ladas & Parry (57) ABSTRACT

A control device for controlling current to a motor includes a current sensor connected to a power module for generating an electric signal corresponding to magnitude of the current to the motor, and a processor connected to first and second current detecting circuits, which are connected to the current sensor and the power module. The first current detecting circuit determines whether the current to the motor is larger than a first predetermined value, and generates a first flag signal provided to the power module. The second current detecting circuit determines whether the current to the motor is larger than a second predetermined value, which is larger than the first predetermined value, and generates a second flag signal provided to the power module. The power module inhibits connection between the motor and a power supply unit upon receiving either one of the first and second flag signals. The processor generates a first flag reset signal to the first current detecting circuit at a first reset frequency for resetting the first flag signal periodically, and a second flag reset signal to the second current detecting circuit at a second reset frequency for resetting the second flag signal periodically.

10 Claims, 7 Drawing Sheets

CONTROL DEVICE FOR CONTROLLING CURRENT PASSING THROUGH A MOTOR

BACKGROUND OF THE INVENTION

1. Field of the Invention

The invention relates to a control device for controlling current passing through a motor, more particularly to a control device for minimizing the presence of ripples in the current passing through the motor.

2. Description of the Related Art

A conventional control device for controlling current passing through a motor includes a pulse width modulator, a power module, and a current limiter for limiting the current passing through the motor. The current limiter includes a current detector provided to detect the current passing through the motor. When the detected current exceeds a predetermined value, an inhibit signal is produced by the current limiter and is sent to the power module to stop the supply of power to the motor. When the detected current drops below the predetermined value, the current limiter dismisses the inhibit signal to the power module to once again permit the supply of power to the motor. However, the inhibit signal is associated with a hysteresis action, and is not synchronous with the pulse width modulated control pulses generated by the pulse width modulator. Therefore, due to the different performance characteristics of the motor, the inhibit signal cannot be reset in each of the pulse width modulated cycles, thereby resulting in a relatively large ripple current to the motor.

SUMMARY OF THE INVENTION

Therefore, the object of the present invention is to provide a control device for controlling stability of current passing through a motor so as to minimize the presence of ripples.

According to the present invention, a control device is adapted for controlling current passing through a motor. The control device includes a power module, a current sensor, a first current detecting circuit, a second current detecting circuit, and a processor.

The power module is adapted to be connected to the motor and a power supply unit.

The current sensor is connected to the power module and generates an electric signal corresponding to magnitude of the current passing through the motor.

The first current detecting circuit is connected to the current sensor and the power module. The first current detecting circuit determines whether the current passing through the motor is larger than a first predetermined value according to the electric signal from the current sensor, and generates a first flag signal that is provided to the power module so as to inhibit connection between the motor and the power supply unit upon detection that the current passing through the motor is larger than the first predetermined value.

The second current detecting circuit is connected to the current sensor and the power module. The second current detecting circuit determines whether the current passing through the motor is larger than a second predetermined value according to the electric signal from the current sensor, and generates a second flag signal that is provided to the power module so as to inhibit connection between the motor and the power supply unit upon detection that the current passing through the motor is larger than the second predetermined value. The second predetermined value is larger than the first predetermined value.

The processor is connected to the first and second current detecting circuits. The processor generates a first flag reset signal to the first current detecting circuit at a first reset frequency for resetting the first flag signal periodically. The processor further generates a second flag reset signal to the second current detecting circuit at a second reset frequency for resetting the second flag signal periodically. The first reset frequency is larger than the second reset frequency.

As such, connection between the motor and the power supply unit is inhibited for a period of time that is longer when the second flag signal is provided to the power module than when the first flag signal is provided to the power module.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
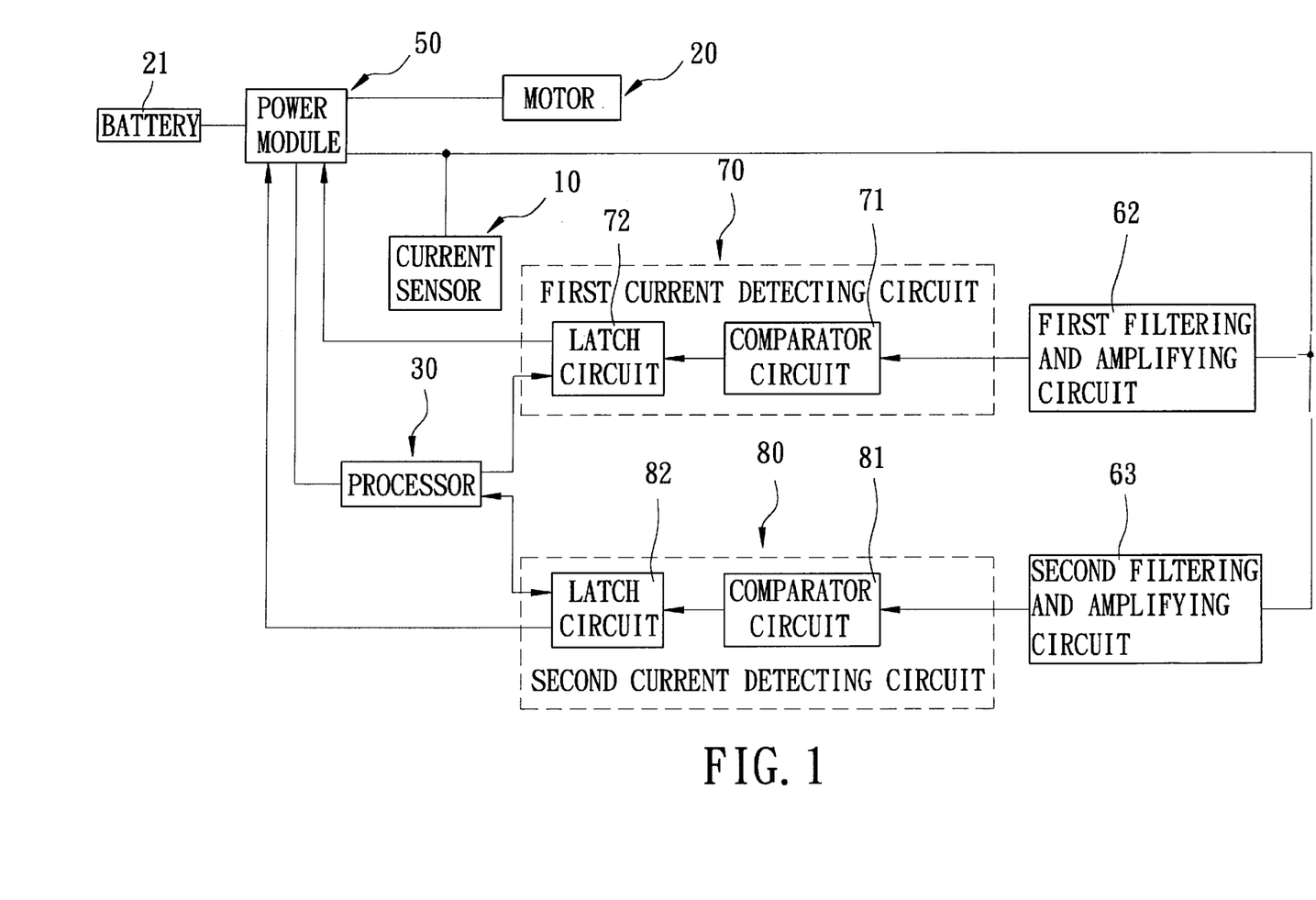
FIG. 1 is a schematic circuit block diagram illustrating the preferred embodiment of a control device for controlling current passing through a motor according to this invention.

Referring to FIG. 1, according to the preferred embodiment of this invention, a control device for controlling current passing through a motor 20 is shown to include a power module 50, a current sensor 10, first and second filtering and amplifying circuits 62, 63, first and second current detecting circuits 70, 80, and a processor 30.

The power module 50 is adapted to be connected to the motor 20 and a power supply unit, such as a battery 21.

The current sensor 10 is connected to the power module 50, and generates an electric signal corresponding to magnitude of the current passing through the motor 20.

Figure 2:
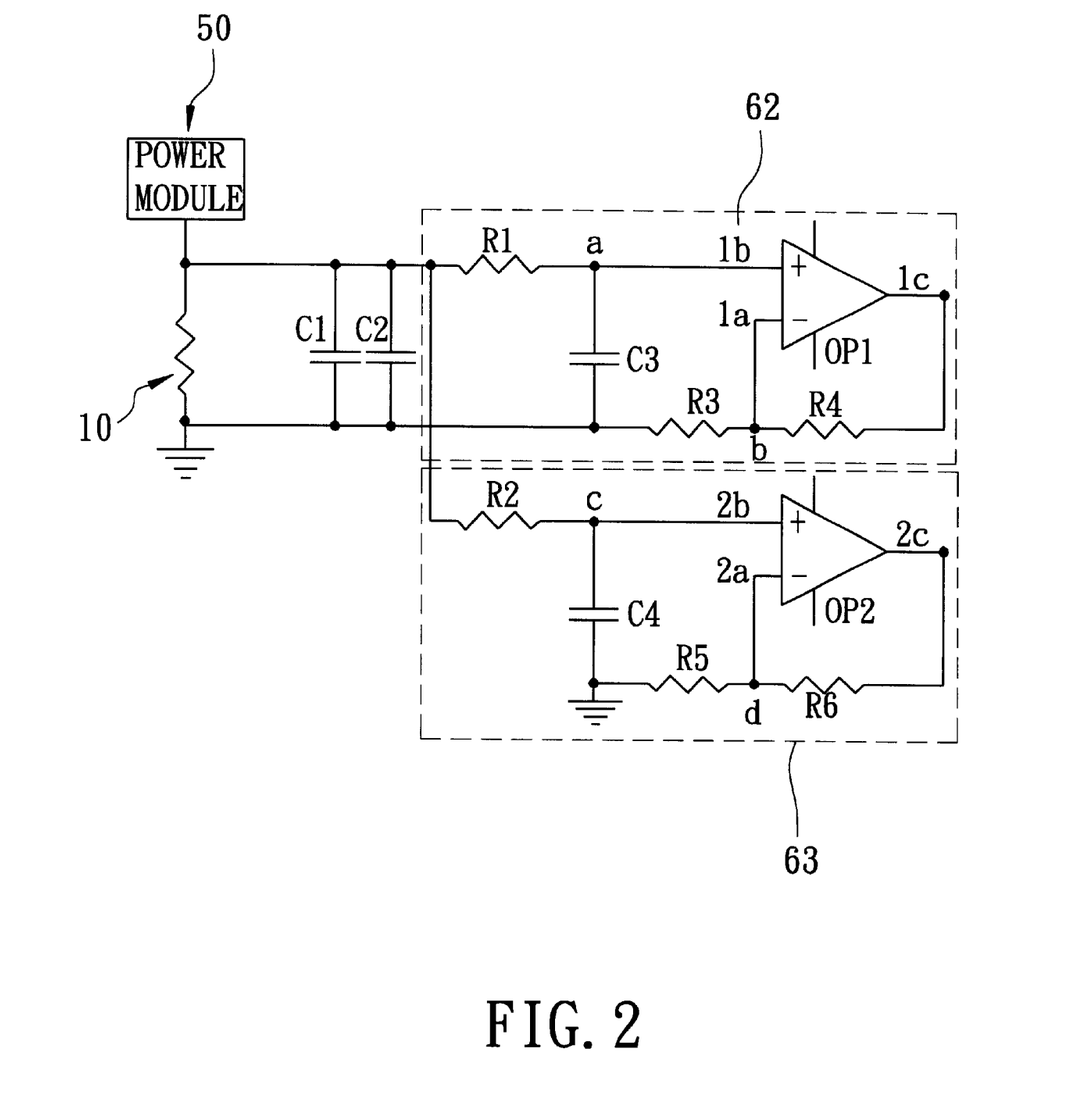
FIG. 2 is a schematic electrical circuit diagram illustrating first and second filtering and amplifying circuits of the preferred embodiment.

The first and second filtering and amplifying circuits 62, 63 are connected to the current sensor 10 and the power module 50. As shown in FIG. 2, the first filtering and amplifying circuit 62 includes resistors (R1, R3, R4), a capacitor (C3) and an operational amplifier (OP1). The resistor (R1) has one end connected to the power module 50 and the current sensor 10, and the other end connected to a junction (a). The capacitor (C3) has a first end connected to the junction (a), and a second end connected to the ground. The resistor (R3) has one end connected to the ground, and the other end connected to a junction (b). The operational amplifier (OP1) has an inverting input (1a) connected to the junction (b), a non-inverting input (1b) connected to the junction (a), and an output (1c) connected to the junction (b) via the resistor (R4). The second filtering and amplifying circuit 63 includes resistors (R2, R5, R6), a capacitor (C4) and an operational amplifier (OP2). The resistor (R2) has one end connected to the power module 50 and the current sensor 10, and the other end connected to a junction (c). The capacitor (C4) has a first end connected to the junction (c), and a second end connected to the ground. The resistor (R5) has one end connected to the ground, and the other end connected to a junction (d). The operational amplifier (OP2) has an inverting input (2a) connected to the junction (d), a non-inverting input (2b) connected to the junction (c), and an output (2c) connected to the junction (d) via the resistor (R6) The first and second filtering and amplifying circuits 62, 63 receive the electric signal from the current sensor 10 for filtering and amplifying the electric signal so as to output a current signal corresponding to the magnitude of the current passing through the motor 20.

Figure 3:
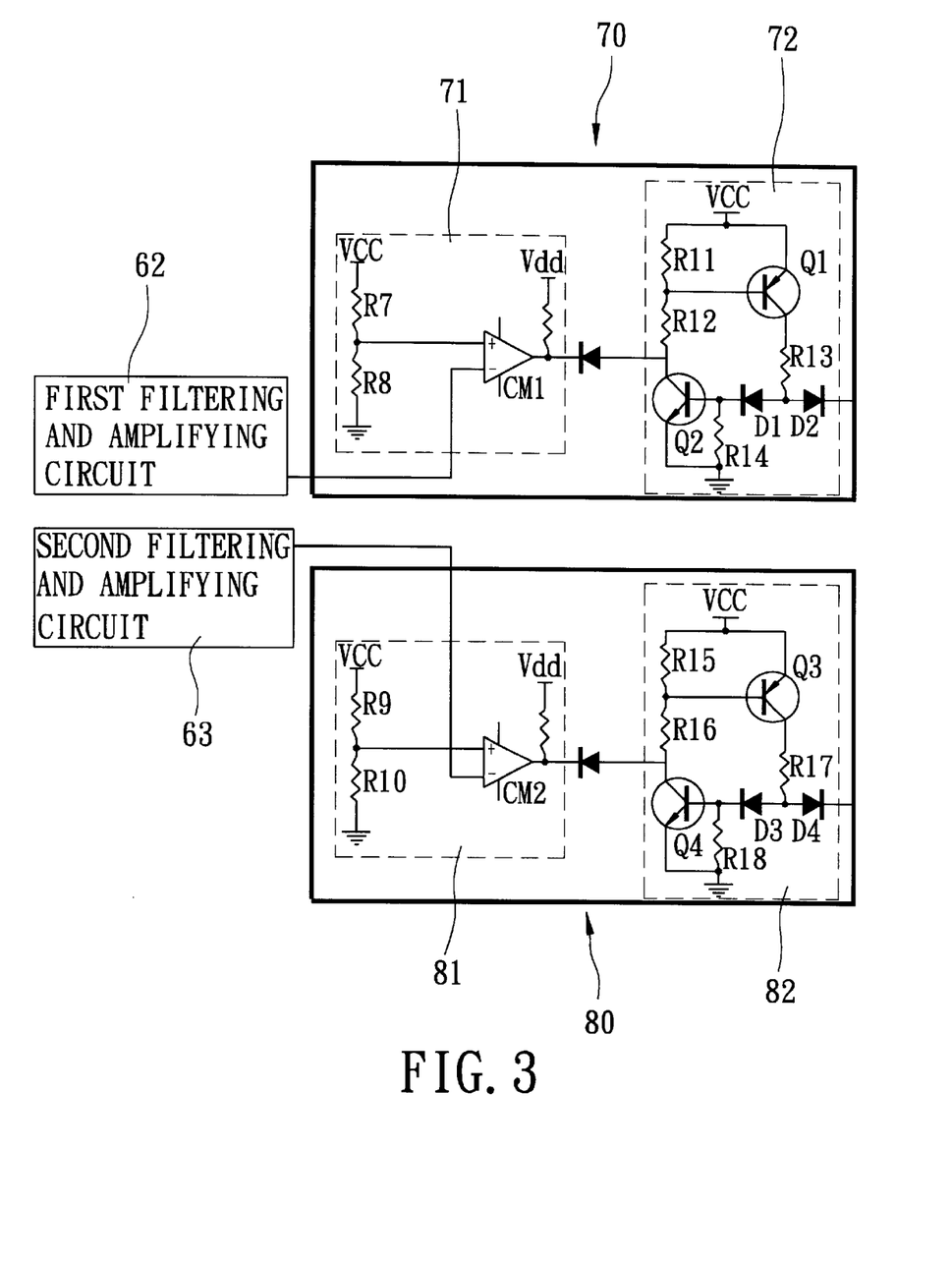
FIG. 3 is a schematic electrical circuit diagram illustrating first and second current detecting circuits of the preferred embodiment

The first current detecting circuit 70 is connected to the first filtering and amplifying circuit 62. The first current detecting circuit 70 determines whether the current passing through the motor 20 is larger than a first predetermined value according to the electric signal from the current sensor 10, and generates a first flag signal, which serves as a current limiting flag signal, that is provided to the power module 50 so as to inhibit connection between the motor 20 and the battery 21 upon detection that the current passing through the motor 20 is larger than the first predetermined value. The first current detecting circuit 70 includes a comparator circuit 71 and a latch circuit 72. The comparator circuit 71 is connected to the first filtering and amplifying circuit 62 for comparing the current signal therefrom with the first predetermined value, which is approximately equal to and not greater than a rated current value of the motor 20. The comparator circuit 71 outputs the first flag signal when the magnitude of the current signal is greater than the first predetermined value. The latch circuit 72 is connected to the comparator circuit 71 for latching the first flag signal from the comparator circuit 71. As shown in FIG. 3, the comparator circuit 71 includes resistors (R7, R8) and an operational amplifier (CM1). The latch circuit 72 includes transistors (Q1, Q2), diodes (D1, D2), and resistors (R11, R12, R13, R14). When the comparator circuit 71 generates the first flag signal, such as a logic low signal, the transistors (Q1, Q2) are on, thereby latching the first flag signal.

The second current detecting circuit 80 is connected to the second filtering and amplifying circuit 63. The second current detecting circuit 80 determines whether the current passing through the motor 20 is larger than a second predetermined value according to the electric signal from the current sensor 10, and generates a second flag signal, which serves as an over-current flag signal, that is provided to the power module 50 so as to inhibit connection between the motor 20 and the battery 21 upon detection that the current passing through the motor 20 is larger than the second predetermined value. The second current detecting circuit 80 includes a comparator circuit 81 and a latch circuit 82. The comparator circuit 81 is connected to the second filtering and amplifying circuit 63 for comparing the current signal therefrom with the second predetermined value, which is larger than and approximately equal to 1.5 times of the rated current value of the motor 20. The comparator circuit 81 outputs the second flag signal when the magnitude of the current signal is greater than the second predetermined value. The latch circuit 82 is connected to the comparator circuit 81 for latching the second flag signal from the comparator circuit 81. As shown in FIG. 3, the comparator circuit 81 includes resistors (R9, R10) and an operational amplifier (CM2). The latch circuit 82 includes transistors (Q3, Q4), diodes (D3, D4), and resistors (R15, R16, R17, R18). When the comparator circuit 81 generates the second flag signal, such as a logic low signal, the transistors (Q3, Q4) are on, thereby latching the second flag signal.

The processor 30 is connected to the latch circuits 72, 82 of the first and second current detecting circuits 70, 80. The processor 30 generates a first flag reset signal, such as a logic low signal, to the latch circuit 72 of the first current detecting circuit 70 at a first reset frequency for resetting the first flag signal periodically. The processor 30 generates a second flag reset signal, such as a logic low signal, to the latch circuit 82 of the second current detecting 80 at a second reset frequency for resetting the second flag signal periodically. The first reset frequency is larger than the second reset frequency. As such, connection between the motor 20 and the battery 21 is inhibited for a period of time that is longer when the second flag signal is provided to the power module 50 than when the first flag signal is provided to the power module 50.

The processor 30 is further coupled to the power module 50, and generates pulse width modulated control pulses to control intermittent operation of the power module 50. Each of the first and second flag reset signals is generated synchronously with one of the pulse width modulated control pulses. Each of the first and second flag reset signals has a pulse width at least equal to total response time of one of the first and second filtering and amplifying circuits 62, 63, and one of the first and second current detecting circuits 70, 80. The pulse width of each of the first and second flag reset signals is not greater than 10% of the pulse width of each of the pulse width modulated control pulses.

Figure 4:
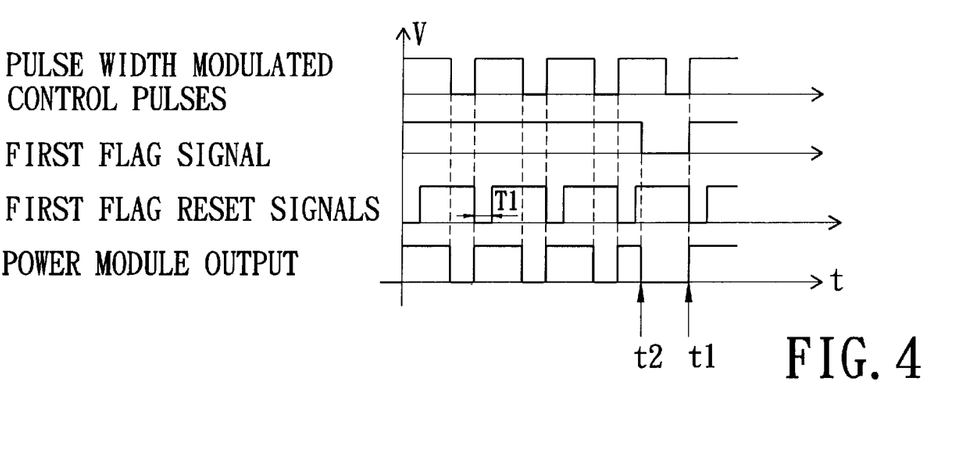
FIG. 4 is a timing diagram showing the relationship among pulse width modulated pulses, a first flag signal, a first flag reset signal, and a power module output signal.
Figure 5:
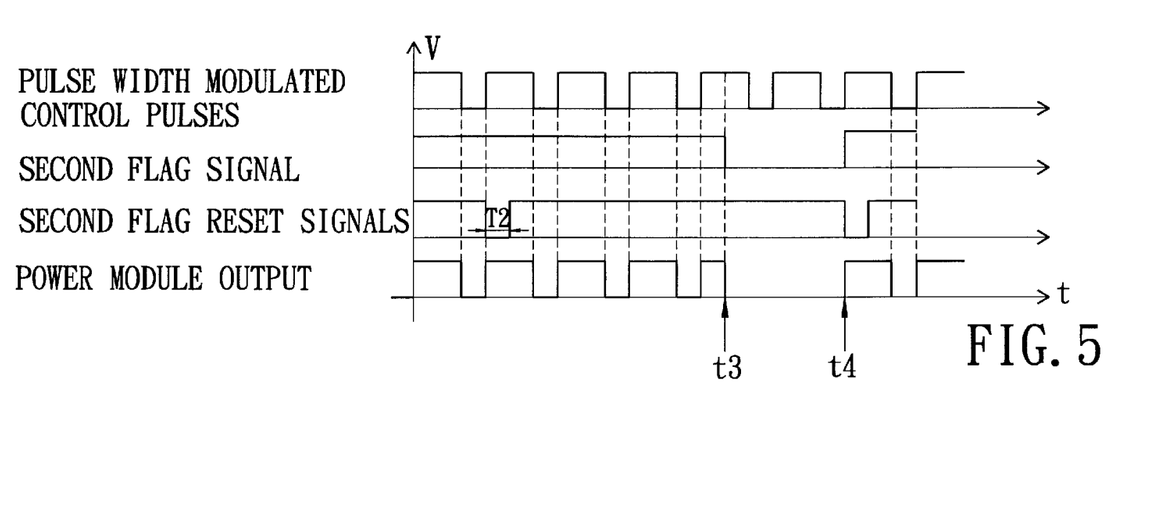
FIG. 5 is a timing diagram showing the relationship among the pulse width modulated pulses, a second flag signal, a second flag reset signal, and a power module output signal.
Figure 6:
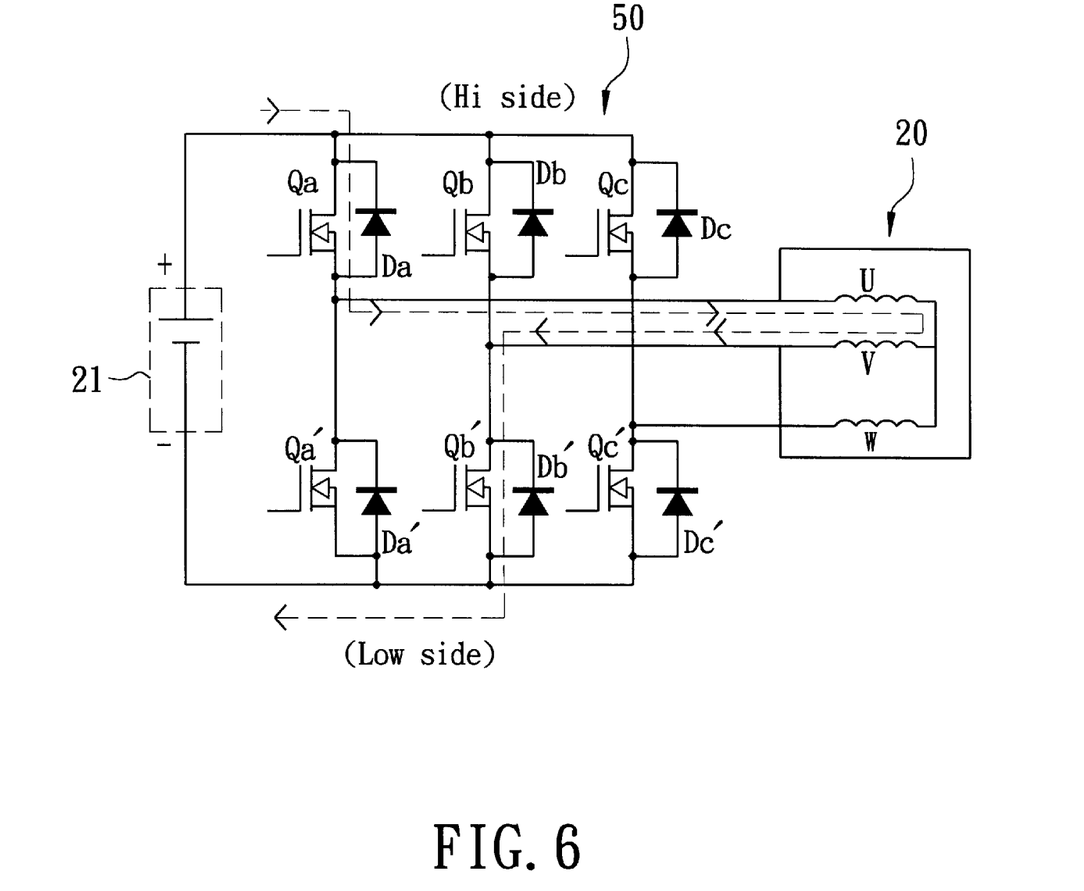
FIG. 6 is a schematic electrical circuit diagram illustrating the power module of the preferred embodiment in a normal state.

Referring to FIGS. 4 and 5, the pulse width of each of the pulse width modulated control pulses is equal to 125 $\mu$sec. The power module output corresponds with the pulse width modulated control pulses when the current passing through the motor 20 is smaller than the first and second predetermined values. As shown in FIG. 6, the current flows from a positive terminal of the battery 21 via a power device (Qa) at a high side of the power module 50, motor coils (U), motor coils (V) and a power device (Qb') at a low side of the power module 50 to a negative terminal of the battery 21.

Figure 7:
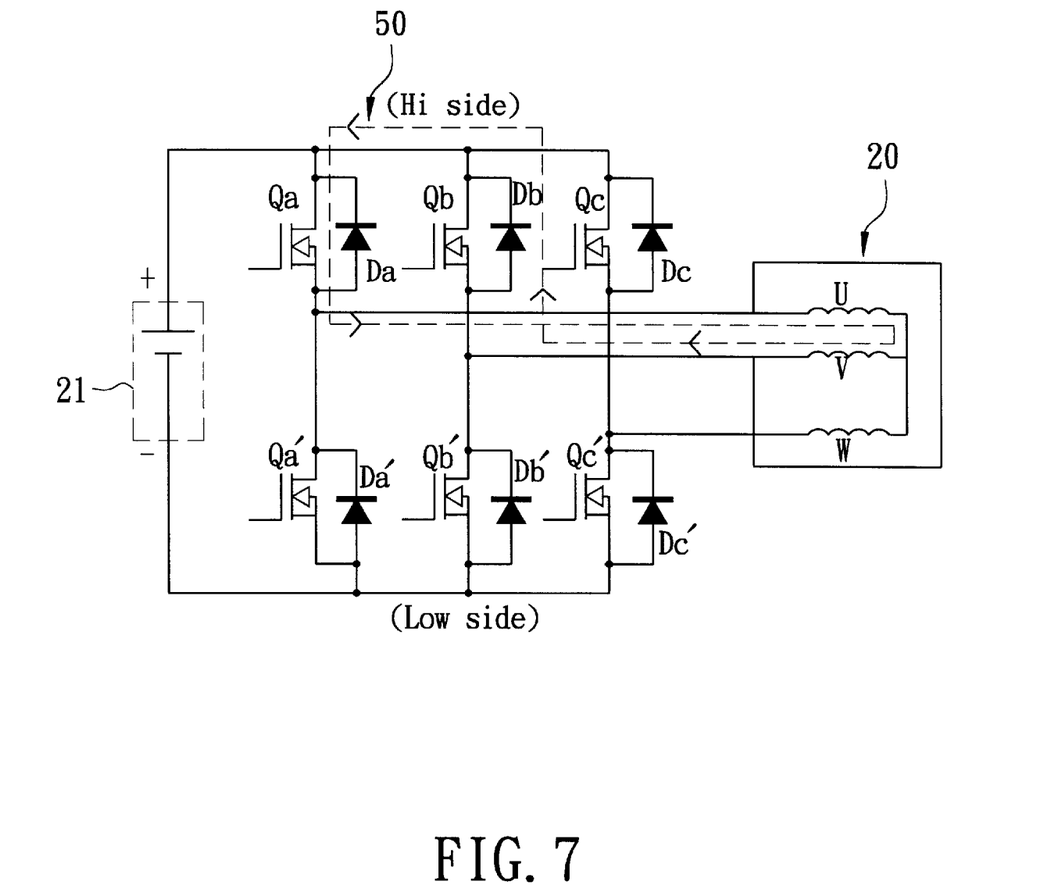
FIG. 7 is a schematic electrical circuit diagram illustrating the power module of the preferred embodiment in a state of use.

As shown in FIG. 4, when the comparator circuit 71 generates the first flag signal (t=t1), the first flag signal is pulled and held to a low level so as to inhibit the power module output until the next first flag reset signal is generated (t=t2) synchronously with a succeeding one of the pulse width modulated pulses. At this time, the first flag signal is reset to high level so that the power module output once again corresponds with the pulse width modulated control pulses. The pulse width (T1) of the first flag reset signal is at least equal to the total response time of the first filtering and amplifying circuit 62 and the first current detecting circuit 70, and is less than 12.5 $\mu$sec. In this embodiment, the first reset frequency is equal to the frequency of the pulse width modulated control pulses. As shown in FIG. 7, when the current limiting state occurs, the power devices (Qa', Qb', Qc') at the low side of the power module 50 are off such that the current flows from the positive terminal of the battery 21 via the power device (Qa), the motor coils (U), the motor coils (V) and a free wheel diode (Db) at the high side of the power module 50 to the positive terminal of the battery 21. In this state, the battery 21 does not provide electric power to the power module 50 such that the current passing through the motor 20 gradually decreases.

Figure 8:
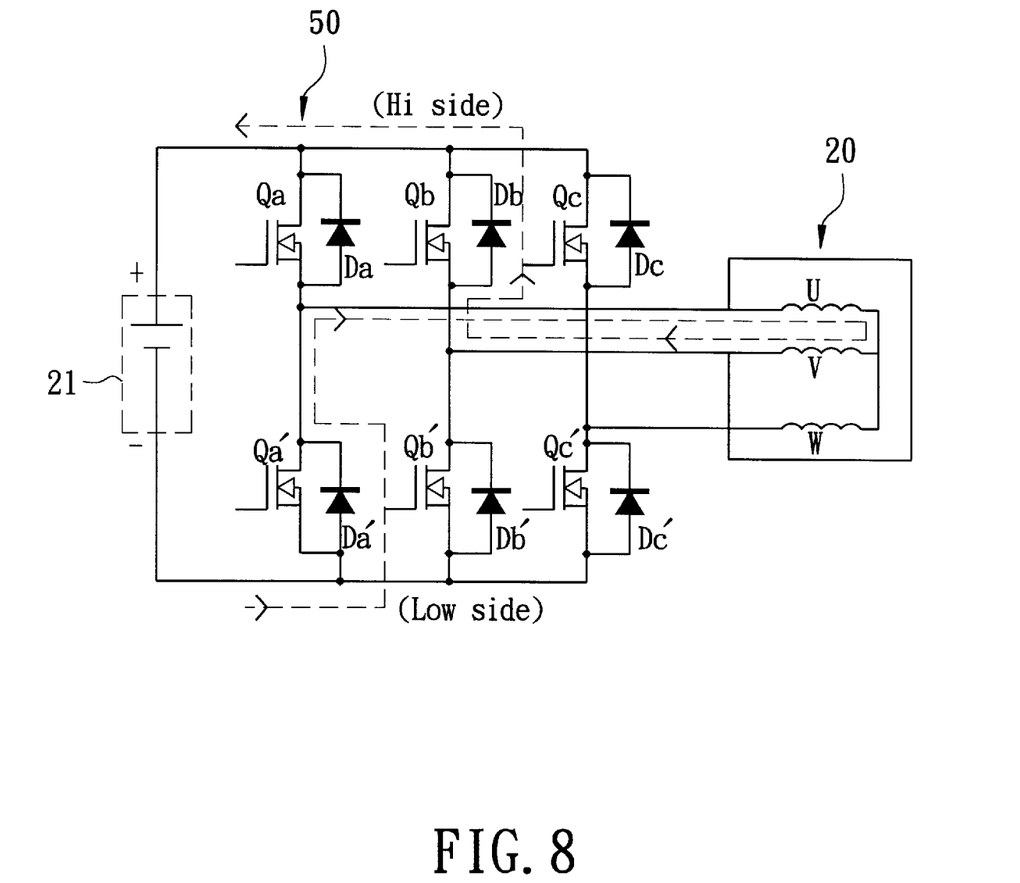
FIG. 8 is a schematic electrical circuit diagram illustrating the power module of the preferred embodiment in another state of use.

As shown in FIG. 5, when the comparator circuit 81 generates the second flag signal (t=t3), the second flag signal is pulled and held to a low level so as to inhibit the power module output until the next second flag reset signal is generated (t=t4) synchronously with one of the pulse width modulated pulses. At this time, the second flag signal is reset to high level so that the power module output once again corresponds with the pulse width modulated control pulses. The pulse width (T2) of the second flag reset signal is at least equal to the total response time of the second filtering and amplifying circuit 63 and the second current detecting circuit 80, and is less than 12.5 $\mu$sec. In this embodiment, the frequency of the pulse width modulated control pulses is five times the second reset frequency. If there are three consecutive second flag signals generated by the comparator circuit 82, the power module output is to be inhibited until the processor 30 receives a power reset signal from the user. As shown in FIG. 8, when the over current state occurs, all of the power devices (Qa, Qb, Qc, Qa', Qb', Qc') are off such that the current flows from the motor coils (V) via the free wheel diode (Db), the positive terminal of the battery 21, the negative terminal of battery 21 and a free wheel diode (Da') at the low side of the power module 50 to the motor coils (U). In this state, the battery 21 can be charged by the current passing through the motor 20 so as to reduce quickly the current passing through the motor 20.

It is noted that the control device of this invention includes the first and second current detecting circuits 70, 80 that can enhance reliability of the control device, and the latch circuits 72, 82 can enhance stability in the current limiting state so as to minimize the presence of ripples in the current passing through the motor 20. The object of the invention is thus met.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A control device for controlling current passing through a motor, comprising:

a power module adapted to be connected to the motor and a power supply unit;

a current sensor connected to said power module for generating an electric signal corresponding to magnitude of the current passing through the motor;

a first current detecting circuit connected to said current sensor and said power module, said first current detecting circuit determining whether the current passing through the motor is larger than a first predetermined value according to the electric signal from said current sensor, and generating a first flag signal that is provided to said power module so as to inhibit connection between the motor and the power supply unit upon detection that the current passing through the motor is larger than the first predetermined value;

a second current detecting circuit connected to said current sensor and said power module, said second current detecting circuit determining whether the current passing through the motor is larger than a second predetermined value according to the electric signal from said current sensor, and generating a second flag signal that is provided to said power module so as to inhibit connection between the motor and the power supply unit upon detection that the current passing through the motor is larger than the second predetermined value, wherein the second predetermined value is larger than the first predetermined value; and a processor connected to said first and second current detecting circuits, said processor generating a first flag reset signal to said first current detecting circuit at a first reset frequency for resetting the first flag signal periodically, said processor further generating a second flag reset signal to said second current detecting circuit at a second reset frequency for resetting the second flag signal periodically, wherein the first reset frequency is larger than the second reset frequency;

whereby, connection between the motor and the power supply unit is inhibited for a period of time that is longer when the second flag signal is provided to said power module than when the first flag signal is provided to said power module.

2. The control device of claim 1, further comprising:

a first filtering and amplifying circuit connected to said power module and interconnecting said current sensor and said first current detecting circuit; and a second filtering and amplifying circuit connected to said power module and interconnecting said current sensor and said second current detecting circuit.

3. The control device of claim 2, wherein each of said first and second current detecting circuits includes:

a comparator circuit connected to a respective one of said first and second filtering and amplifying circuits; and a latch circuit connected to said comparator circuit for latching output of said comparator circuit;

said first and second flag signals being obtained from said latch circuits of said first and second current detecting circuits, respectively;

said latch circuits of said first and second current detecting circuits being further connected to said processor so as to permit resetting of said first and second flag signals.

4. The control device of claim 3, wherein:

said processor is further coupled to said power module and generates pulse width modulated control pulses to control intermittent operation of said power module;

each of said first and second flag reset signals being generated synchronously with one of the pulse width modulated control pulses.

5. The control device of claim 4, wherein each of said first and second flag reset signals has a pulse width at least equal to total response time of one of said first and second filtering and amplifying circuits, and one of said first and second current detecting circuits.

6. The control device of claim 5, wherein the pulse width of each of said first and second flag reset signals is not greater than 10% of the pulse width of each of the control pulses.

7. The control device of claim 4, wherein said first reset frequency is equal to frequency of the pulse width modulated control pulses, and said second reset frequency is smaller than the frequency of the pulse width modulated control pulses.

8. The control device of claim 1, wherein:

said processor is further coupled to said power module and generates pulse width modulated control pulses to control intermittent operation of said power module;

each of said first and second flag reset signals being generated synchronously with one of the pulse width modulated control pulses.

9. The control device of claim 8, wherein said first reset frequency is equal to frequency of the pulse width modulated control pulses, and said second reset frequency is smaller than the frequency of the pulse width modulated control pulses.

10. The control device of claim 1, wherein the first predetermined value is approximately equal to and not greater than a rated current value of the motor, and the second predetermined value is larger than the rated current value of the motor.

* * * * *